(12) United States Patent
Gilfix et al.

(10) Patent No.: US 8,331,351 B2
(45) Date of Patent: Dec. 11, 2012

(54) COMMUNICATING WITH SESSION INITIATION PROTOCOL (SIP) APPLICATION SESSIONS USING A MESSAGE-ORIENTED MIDDLEWARE SYSTEM

(75) Inventors: Michael Gilfix, Austin, TX (US); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1578 days.

(21) Appl. No.: 11/620,454

(22) Filed: Jan. 5, 2007

(65) Prior Publication Data

US 2008/0165762 A1    Jul. 10, 2008

(51) Int. Cl.
*H04L 12/66* (2006.01)
*G06F 15/16* (2006.01)
(52) U.S. Cl. ........................ 370/352; 709/227
(58) Field of Classification Search ............ 370/352, 370/229, 401, 467; 709/207, 206, 227
See application file for complete search history.

(56) References Cited

U.S. PATENT DOCUMENTS

| 6,671,364 | B2 | 12/2003 | Rosera et al. |
| 6,813,342 | B1 | 11/2004 | Chu et al. |
| 2005/0044159 | A1 | 2/2005 | Niemi et al. |
| 2005/0105464 | A1 | 5/2005 | Acharya et al. |
| 2005/0135255 | A1 | 6/2005 | Drouet et al. |
| 2005/0213606 | A1 | 9/2005 | Huang et al. |
| 2007/0165653 | A1 | 7/2007 | Wiatrak et al. |

OTHER PUBLICATIONS

Ubiquitous Computing Using SIP, S. Berger et al.; 2003.
A Service Framework for Carrier Grade Multimedia Services Using Parlay APIs Over SIP System, R. Pailer et al., 2001.
Using Parlay APIs Over a SIP System in a Distributed Service Platform for Carrier Grade Multimedia Services, R. Paller et al., 2003.

*Primary Examiner* — Chandrahas Patel
*Assistant Examiner* — Stephanie Chang
(74) *Attorney, Agent, or Firm* — Yee & Associates, P.C.; David A. Mims, Jr.

(57) ABSTRACT

A messaging service communicates with a Session Initiation Protocol (SIP) application session by registering the SIP application session with a messaging server, and then publishing an addressable messaging endpoint corresponding to the SIP application session in response to registering the SIP 15 application session with the messaging server. Consequently, communication with the SIP application session can occur via messages directed to the published addressable messaging endpoint.

9 Claims, 8 Drawing Sheets

COMMUNICATING WITH SESSION INITIATION PROTOCOL (SIP) APPLICATION SESSIONS USING A MESSAGE-ORIENTED MIDDLEWARE SYSTEM

BACKGROUND OF THE INVENTION

1. Technical Field

The present invention is generally directed to session initiation protocol or session initiated protocol (SIP) systems. More specifically, the present invention is directed to a system, computer program product and method of communicating with SIP application sessions using a message-oriented middleware system.

2. Description of Related Art

Telephone Companies (Telcos) are investing in creating and deploying voice over Internet Protocol (VoIP) infrastructure. VoIP allows one to make telephone calls using a computing device connected to a data network such as the Internet. Specifically, in VoIP an analog voice signal from a telephone is converted into a digital signal that travels over the Internet. When the digital signal arrives at its destination, it is converted back into the original analog voice signal.

There are several protocols currently used in implementing VoIP. These protocols include H.323, a standard created by the International Telecommunication Union, Media Gateway Control Protocol and SIP. One of the challenges facing the worldwide use of VoIP is that these protocols are not always compatible. Nonetheless, SIP is rapidly becoming the de facto protocol for VoIP.

SIP is an application-layer protocol used for establishing, managing, and terminating sessions between two or more Internet protocol (IP) endpoints or user agents (UAs). In a VoIP operation, the UAs initiate and respond to SIP messages, and SIP proxy servers route the SIP messages toward their destination UAs. Thus, one of the main functions of SIP is routing messages from UA clients via a path of SIP proxy servers to UA servers. To route SIP messages, the SIP proxy servers use, among other technologies, SIP servlets.

A SIP servlet is a Java-based application component, managed by a SIP container. SIP containers implement Java Specification Request (JSR) 116 SIP servlet Specification and also contain SIP protocol stacks that implement all pertinent SIP Requests for Comments (RFCs) standards. For example RFC 3261, which is used to establish and terminate SIP calls, is implemented by an application that runs within the SIP container.

Consequently, when a message arrives at a SIP server, it is sent to the SIP container which routes the message to an appropriate SIP servlet contained therein for processing. In a converged HTTP/SIP servlet container where both SIP and HTTP servlets are deployed, the SIP container associates incoming HTTP and SIP messages with converged SipApplicationSessions using HTTP or SIP protocol-specific headers. In a distributed SIP application server environment, protocol-specific headers allow load balancing elements to direct HTTP or SIP messages to a specific container that handles a given converged session.

As is well known, Java 2 Platform, Enterprise Edition (J2EE) simplifies application program development and decreases the need for programmer training by creating standardized, reusable modular components. Further, J2EE provides dynamic loading features which facilitate deployment and update of applications at runtime. J2EE has a built-in security framework that allows containers to restrict applications in what actions they can perform. J2EE also provides access to a large set of useful functionality, such as JDBC (Java Database Connectivity) for database access, JNDI (Java Naming and Directory Interface) for directory lookups and JMS (Java Message service) for inter-network communications.

Since SIP servlets are based on standard Java Servlet technology, they can be incorporated into the larger J2EE framework. Incorporating SIP servlets into the larger J2EE framework avails SIP of all the functionalities of J2EE, including JMS.

However, there is currently no mechanism available to associate JMS messages with particular converged SIP sessions. Specifically, JMS lacks protocol-specific headers and routing mechanisms for handling SIP messages in a distributed environment. Consequently, it is difficult for converged HTTP/SIP applications to participate in message-oriented middleware (i.e. JMS) programming practices.

Therefore, what is needed are a system, computer program product and method of communicating with SIP application sessions using a message-oriented middleware system.

SUMMARY OF THE INVENTION

The present invention provides a system, computer program product and computer-Implemented method of communicating with a Session Initiation Protocol (SIP) application session using a messaging service. In one embodiment of the invention, the system, computer program product and computer-Implemented method register the SIP application session with a messaging server. The system, computer program product and computer-Implemented method then publish an addressable messaging endpoint corresponding to the SIP application session in response to registering the SIP application session with the messaging server. This allows communication with the SIP application session to occur via messages directed to the published addressable messaging endpoint.

The addressable messaging endpoint includes a session identification (ID) assigned to the SIP application session upon creation of the SIP application session. This ID is used as a message selector to allow the messaging server to filter in messages to the SIP application session as well as to allow the SIP application session to select messages addressed thereto. Consequently, Web services or hypertext transport protocol (HTTP) requests and responses can be used as messages to the SIP application session.

Note that the messaging server may be an application server that has been converted to a point-to-point queue. Note also that registering the SIP application session with the messaging server includes subscribing the SIP application session to a message topic.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1(*b*) depicts an exemplary cluster of application servers.

FIG. 1(*c*) depicts an exemplary logical connection between a SIP application server and a SIP client when the present invention is used to set up a conference call.

DETAILED DESCRIPTION OF THE PREFERRED EMBODIMENT

Figure 1A:
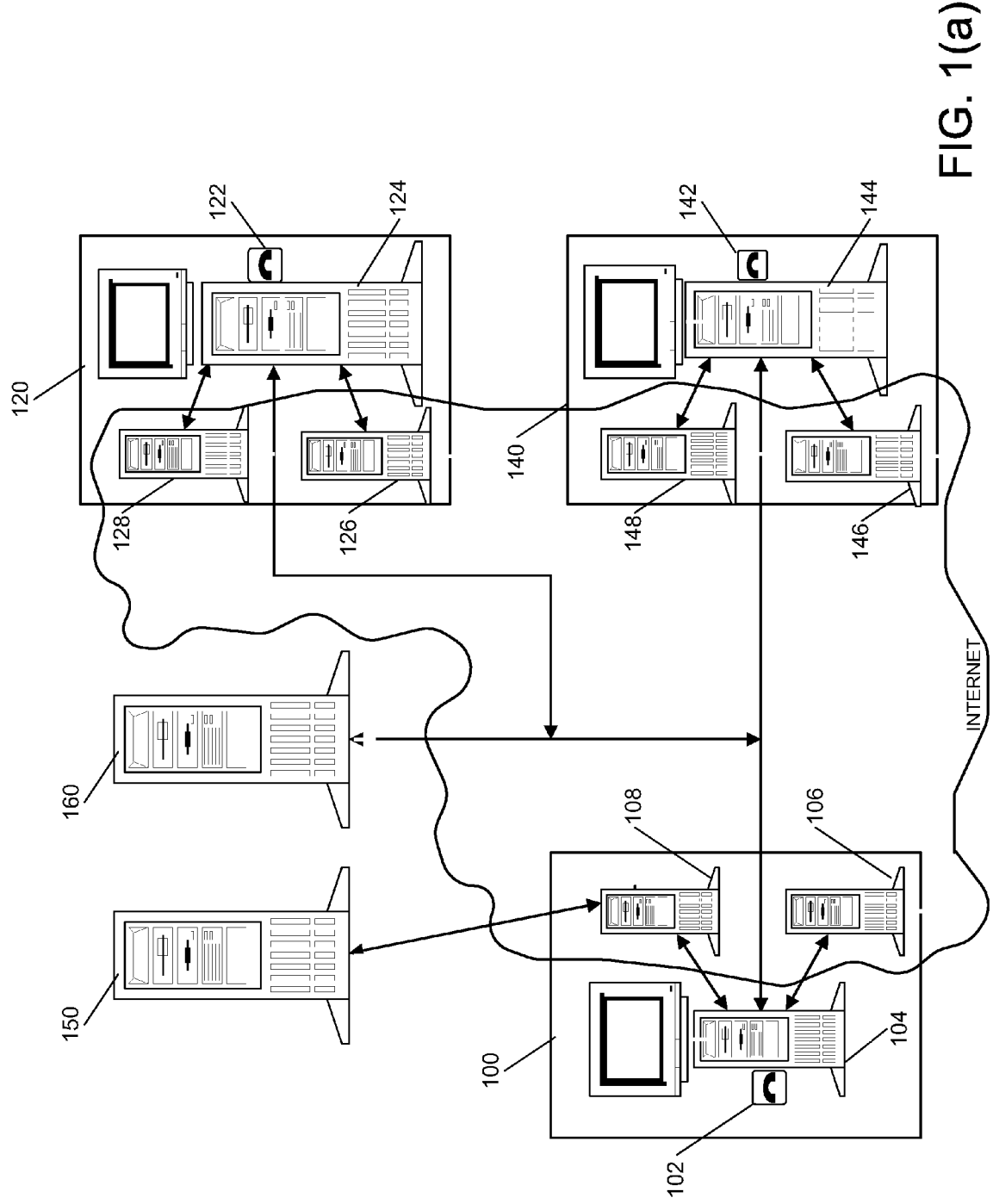
FIG. 1(*a*) depicts an exemplary SIP system that may be used for audio/videoconferencing.

With reference now to the figures wherein like reference numerals identify like parts, FIG. 1(a) depicts an exemplary SIP system that may be used for audio/video conferencing. In this figure, there are three users (i.e., user A in SIP domain A 100, user B in SIP domain B 120 and user C in SIP domain C 140). Each domain contains a user agent (UA), a telephone, a proxy server and a registrar server. For example, domain A includes telephone 102, $UA_A$ 104, proxy server 108 and registrar server 106, while domain B has telephone 122, $UA_B$ 124, proxy server 128 and registrar server 126 and domain C has telephone 142, $UA_C$ 144, proxy server 148 and registrar server 146.

In addition, the SIP system contains a redirect server 150 and a central server 160. The redirect server 150 is a SIP server that provides up-to-date routing information. For example, the redirect server 150 may direct a UA to use an alternate set of uniform resource identifiers (URIs) to contact another UA based on time of day. The central server 160 manages the conference by maintaining various communication paths to computers or other client devices that are being used by different parties participating in the conference. Note that the system in FIG. 1(a) is not inclusive of all devices that may be included in all SIP systems. For example, it does not contain digital telephones or presence servers etc. Thus, FIG. 1(a) is used for illustrative purposes only.

Generally to start a conference call, one user (e.g., user A at $UA_A$ 104 in domain A 100) may initiate the process by letting proxy server 108 know that one or all of the other users are to be contacted. Assume in this case, only one of the users (e.g., $UA_B$ 124 in domain B 120) is to be contacted. This initiation ordinarily entails a request regarding where to send call set-ups for domain B 120. Proxy server 108 may contact redirect server 150 to find out how to contact domain B 120. Redirect server 150 may provide to proxy server 108 the address of proxy server 128 in domain B 120 where all call setup requests for domain B are to be directed. Proxy server 108 may contact proxy server 128 to request the call setup with domain B 120. Upon receiving the call setup request, proxy server 128 will contact registrar server 126 to find out what $UA_B$'s address is. Of course, user B must have registered with registrar server B 126 prior to the call setup request.

Registrar server 126 may, when contacted, forward $UA_B$ 124's address to proxy server 128. Proxy server 128 may then provide a call notification to $UA_B$ 124. After responding to the call notification, a media path may be established between user A and user B through telephone 102, $UA_A$ 104, central server 160, $UA_B$ 124 and telephone 122.

At any time during the conference, either user A or user B may invite user C to join the conference. When user C is invited to join the conference, the same process outlined above for connecting user A to user B may occur between the UA of the user that invites user C to join the conference and proxy server 148, registrar server 146 and $UA_C$ in domain C 140. Once communication is established with $UA_C$ 144, the media path established earlier will now include $UA_C$ 144 and telephone 142.

According to the present invention, if JMS messages can be associated with converged SIP sessions, an HTTP servlet, Enterprise Java Bean (EJB) or Web Service can be used to instruct the SIP Application to invite user C into the conference call. Indeed, any and all SIP messages can be sent from one UA to a SIP server and vice versa via an HTTP servlet, Enterprise Java Bean (EJB) or Web Service. The present invention provides a mechanism by which this can occur. Specifically, the present invention combines message-oriented middleware/Java Message Service (JMS) mechanisms with standard JSR 116 SIP servlet listeners to provide each SIP application session with a JMS-addressable endpoint. This allows the SIP application session to receive messages. By providing JMS-based interfaces to SIP functionality, SIP servlet developers can quickly write SIP logic that can be used by anyone or interfaced anywhere within the J2EE landscape.

This approach has many advantages. For example, it allows HTTP servlets, enterprise Java beans (EJBs), and other JMS-capable clients to send JMS requests directly to SIP application sessions. Further, it provides SIP application sessions with a context-friendly way to process those requests. Requests are processed within JMS provider threads, and as will be explained later, prevents Web or SIP container threads from being utilized for the requests.

Further, SIP messages are asynchronous. Thus, by avoiding the container request dispatching threads, the present invention encourages synchronous requests both to and from the SIP application sessions and greatly simplifies the programming model for SIP servlet application developers.

In addition, the approach advocated by the present invention allows a client to maintain the information necessary to contact SIP application sessions; thus facilitating cluster-based application development while following established J2EE standards.

An example of a cluster-based application server conducive to the present invention is a WebSphere™ Application Server (Websphere is a registered mark of International Business Machines Corporation (IBM) and WebSphere™ Application Server is a product of IBM). WebSphere™ Application Server is an application server on which a process that runs application servlets, JavaServer Pages, and/or EJBs executes. (Note that servlets, JavaServer Pages and EJBs are products of SunMicrosystems, Inc.) The application server provides servlet runtime components and an EJB runtime container. That is, the application server extends the ability of an HTTP server to handle Web application requests, and allows a server to generate dynamic, customized responses to client requests.

Several WebSphere™ Application Servers may be grouped together into a cluster to provide load balancing and failover support. Each application server in the cluster runs the same set of applications, and a deployment manager manages the whole cluster. To a user, this cluster of servers appears as a single application server.

Figure 1B:
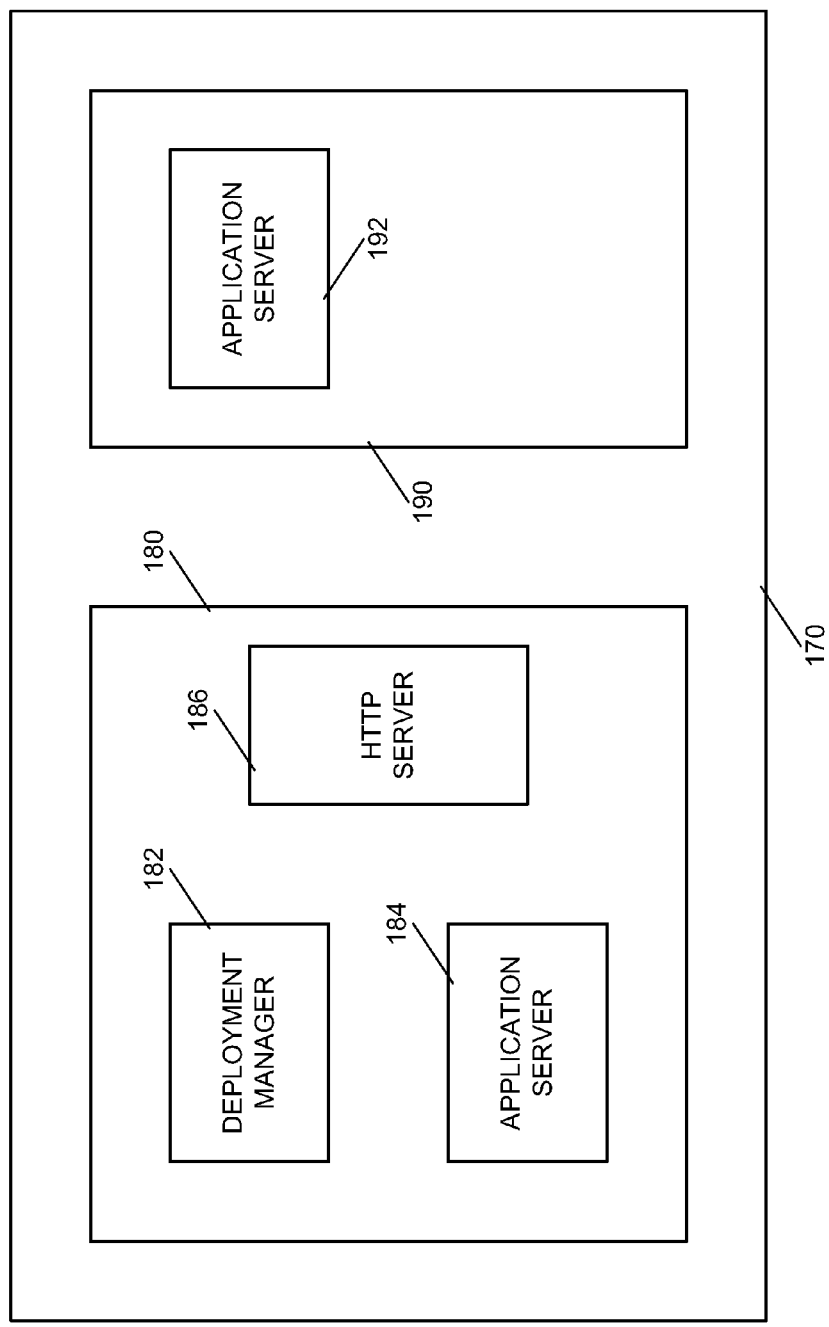

FIG. 1(b) depicts an exemplary cluster 170 of application servers. The cluster 170 includes nodes 180 and 190. Node 180 comprises deployment manager 182, application server 184 and HTTP server 186 while node 190 includes application server 192. HTTP server 186 is an application server that provides responses to HTTP requests and as mentioned above, deployment manager 182 manages cluster 170. For the purpose of this invention, nodes 180 and 190 represent each a different computer system. Accordingly, node 180 may be central server 160 while node 190 may be redirect server 150.

Note that cluster 170 is only an example of clusters that may be used with the invention and the components (e.g., nodes 180 and 190) are not all inclusive. A cluster may have more than two nodes which all or part thereof can be each in a partition of a logically partitioned (LPAR) computer system or on different computer systems altogether. Further, in addition to the components shown in FIG. 1(b), a cluster may also include: (1) a node agent for managing the servers running on a node; (2) a cell which is a logical group of nodes that are combined to allow for a single point of administration; (3) a managed server which is an application server process running in its own Java™ Virtual Machine (JVM) that is part of a cell. Thus, the cluster 170 of FIG. 1(b) is used for illustrative purposes only.

To better understand the invention, a brief description of a JMS system is necessary. A typical JMS client uses: (1) JNDI to find a connectionFactory object; (2) JNDI to find one or more destination objects; (3) the connectionFactory object to create a JMS connection; (4) the JMS connection to create one or more JMS sessions; and (5) a session and one or more destinations to create messageProducers and messageconsumers.

A connectionFactory is an object a client uses to create a connection to a provider. A connectionFactory encapsulates a set of connection configuration parameters that has been defined by an administrator. Using JNDI, a JMS client can obtain access to a JMS provider by first looking up a connectionFactory in order to send and receive messages.

A destination is an object a client uses to specify targets of messages it produces and sources of messages it consumes. In a PTP (Point-to-Point) messaging domain, destinations are called queues. In the publication/subscription messaging domain, destinations are called topics. Creating destinations using the Application Server is a two-step process. First, a JMS destination resource that specifies the JNDI name of the destination is created. Second, a physical destination to which the JNDI name refers is created.

A JMS client accesses connectionFactory and destination objects through portable interfaces. Thus, a client application can run with little or no change on more than one implementation of the JMS API. Ordinarily, an administrator configures a connectionFactory and destinations in a JNDI namespace, and JMS clients then look them up by using the JNDI API.

A JMS connection encapsulates a virtual connection with a JMS provider. A connection could represent an open TCP/IP socket between a client and a provider service. JMS connections are used to create one or more sessions.

A session is a single-threaded context for producing and consuming messages. Sessions are used to create message producers, message consumers and messages. Sessions serialize the execution of message listeners.

A message listener is an object that acts as an asynchronous event handler for messages. This object implements a MessageListener interface, which contains one method: onMessage. In the onMessage method, the actions to be taken when a message arrives are defined. A message listener is registered with a specific MessageConsumer by using a setMessageListener method.

After the message listener is registered, the start method is called on the JMS connection to begin message delivery. When message delivery begins, the JMS provider automatically calls the message listener's onMessage method whenever a message is delivered. The onMessage method takes one argument of type Message, which can be cast to any message types.

Note that a message listener is not specific to a particular destination type. The same listener can obtain messages from either a queue or a topic, depending on the type of destination for which the message consumer was created. A message listener does, however, usually expect a specific message type and format. Moreover, if it needs to reply to messages, a message listener must either assume a particular destination type or obtain the destination type of the message and create a producer for that destination type.

The onMessage method should handle all exceptions. The session used to create the message consumer serializes the execution of all message listeners registered with the session. At any time, only one of the session's message listeners is running.

If a messaging application needs to filter messages it receives, a JMS API message selector may be used, which allows a message consumer to specify the messages it is interested in. Message selectors assign the work of filtering messages to the JMS provider rather than to the application.

To implement an embodiment of the invention, the cluster-scope application server (i.e., application servers 182 and 192 of FIG. 1(b)) can be defined as an application-specific JMS point-to-point queue. This application server then becomes a messaging server with which SIP application sessions register to receive JMS messages. Application servers can be defined as JMS point-to-point queues through their administrative features. This is well known in the field and will not be explained here.

In any event, a SIP servlet should be developed that will implement: (1) a JMS MessageListener; and (2) a SIPApplicationSessionListener. As mentioned above, the JMS MessageListener is used to receive messages delivered asynchronously. Thus, the JMS MessageListener will have to register with the messaging server in order to receive the messages. Further, since the SIP application sessions are interested in messages that are only directed to them, the JMS MessageListener of a SIP application session should be registered with a selector upon servlet initialization. In this case, the selector may be "applicationId=create".

As mentioned above when the message listener is registered, the start method is called on the JMS connection to begin message delivery. When message delivery begins, the JMS provider automatically calls the message listener's onMessage method whenever a message is delivered.

In the present case, the first message that is to be sent to the messaging server is a message containing a request with the selector "applicationId=create". Upon receiving the message, the onMessage method (i.e., JMS MessageListener.onMessage) will be called to handle the message. According to an embodiment of the invention, the onMessage method, when called, will create a new SIPApplicationSession since "applicationId=create" using SIP container resources (e.g., SipFactory).

According to JSR 116, upon creation of a new SIPApplicationSession, the SIP container running on the SIP application server (i.e., central server 160) is required to assign a session ID to the newly created session. The ID is a token that can be obtained by invoking a method (i.e., SipApplicationSession.getId( )) and is similar to HTTP session IDs. Based on an embodiment of the invention, the "onMessage" is to obtain the ID and create a response to the JMS request to provide the session ID to the JMS system.

The SipApplicationSessionListener created by the servlet, on the other hand, will be used to receive notifications about SipApplicationSession objects in the SIP application. To receive the notifications, the SIPApplicationSession must be configured in the deployment descriptor of the servlet application. Consequently, the SIP servlet will have to declare the listener within SIP application deployment descriptor sip.xml.

Generally, SIPApplicationSessionListeners contain three methods that are used to provide the notifications: a sessionCreated method, a sessionDestroyed method and a sessionExpired method. As the names suggest, the sessionCreated method (i.e., SIPApplicationListener.sessionCreated) is used to provide notification of a session's creation, the sessionDestroyed method (i.e., SIPApplicationListener.sessionDestroyed) is used for notification of a session's invalidation while the sessionExpired method (i.e., SIPApplicationListener.sessionExpired) is used for notification of a session's expiration.

Upon creation of the new SIP application session, the SIPApplicationListener.sessionCreated will be activated. The SIPApplicationListener.sessionCreated should be implemented such that when it is activated, it instantiates a SIPApplicationSessionMessageListener object. The object should implement the JMS MessageListener interface. The object should also hold reference to the SIPApplicationSession for which SIPApplicationListener.sessionCreated was invoked.

Further, the SIPApplicationListener.sessionCreated, upon activation, should store current servletContext/servletConfig within the SIPApplicationSessionMessageListener as well as store the SIPApplicationSessionMessageListener within the SIPApplicationSession as an attribute.

Thus, to create a SipApplicationSession, an embodiment of the present invention generates a JMS request and sends the request to the messaging server with an "applicationId=create" as a selector and with a JMSReplyTo header allowing for a JMS response. Upon receiving the JMS message, the messaging server will evaluate the message and determine that the SipServlet implementing JMS MessageListener or SipServlet.MessageListener is to be invoked. The messaging server will invoke the SipServlet which in turn will create the SipServlet.MessageListener. Within the SipServlet.MessageListener code, the servlet will use SIP container resources (e.g., SipFactory) to create the SipApplicationSession.

When the SipApplicationSession is created, the SipApplicationSessionListener.sessionCreated in the SIP container will instantiate and register the SipApplicationSession's messageListener (i.e., SipApplicationSessionMessageListener) with the messaging server with the particular application ID, which is a unique ID on a cluster-scope server, as a selector. Therefore, the SipApplicationSessionMessageListener will only receive JMS requests addressed to its particular application ID.

The SipServlet.MessageListener code will generate a JMS response to the JMS request. The JMS response contains the application ID. As mentioned above, the application ID is a Serialized ID that is given to the session by the cluster-scope application server. Once the client receives the JMS response, it can now directly address the newly created SipApplicationSession by using the application ID.

Figure 1C:
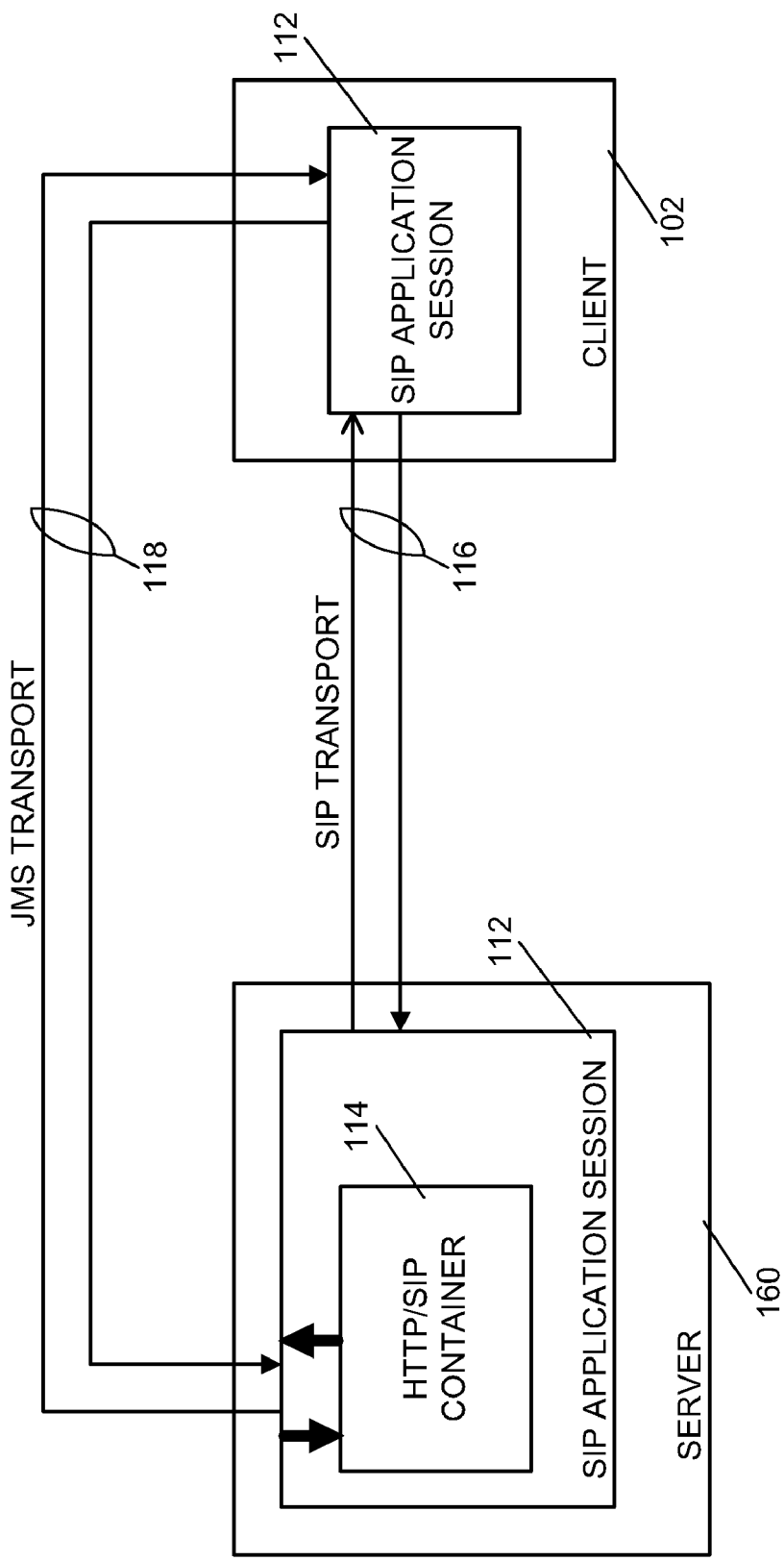

FIG. 1(c) depicts an exemplary logical connection between a SIP application server and a SIP client when the present invention is used to set up a conference call. The SIP application server may be SIP application server 160 and the client may be any one of the clients 102, 122 and 142. In this particular example, only one client is used in order not to obfuscate the disclosure. The client used is client 102.

The SIP application server 160 has an instance of a SIP application session 112 running in which HTTP/SIP converged container 114 is executing to manage the SIP application call. Client 102 also has an instance of a SIP application session 112 running thereon facilitating the call. According to an embodiment of the present invention, the instance of the SIP application session 112 on the server 160 and that of the SIP application session 112 on the client 102 may communicate to each either through JMS transport 118 or through regular SIP transport 116. Note that on failover, the SIP tasks performed by server 160 may be performed by server 150 since the application server is of cluster-scope.

As is well known in the field, to use the JMS transport a JMS endpoint URL is used. This URL specifies the JMS destination and connection factory as well as the port component name for the JMS message. This is similar to HTTP endpoint URL, which specifies host and port, as well as context root and port component name.

In any case, an HTTP servlet, EJB or Web Service, via the JMS transport 118, can invoke an operation/logic within the context of an existing SipApplicationSession (i.e., invite someone to a teleconference, mute/un-mute someone etc.). To do so, the client code will generate a JMS request to the messaging server 160 with an application ID equal to the stored applicationId. The messaging server 160, upon receiving the message, evaluates the JMS message and determines that the SipApplicationSessionMessageListener interface is the only MessageListener with an appropriate selector, the applicationId. The JMS provider's thread invokes SipApplicationSessionMessageListener.onMessage. Because of JMS semantics, a second message cannot be delivered to this listener until the first message has finished processing.

Within SipApplicationSessionMessageListener, the SIP application may take the necessary action. This includes, but is not limited to, initiating outgoing SIP signaling, waiting for an incoming SIP signal, making a lengthy blocking call, etc. Because the ServletContext/ServletConfig. was stored within the SipApplicationSessionMessageListener at creation time, the SIP application's logic has full access to SIP container resources in HTTP/SIP container 114 as if it were executing within a regular SIP servlet. If the request requires a reply, the SipApplicationMessageListener may use the request's JMSReplyTo header to generate a response to the original request. The response may communicate any message content the SIP application session wishes to provide.

While processing regular SIP servlet code, there may be a need for SipServlet.service( ) to return quickly in order to allow a limited number of RequestDispatcher threads to perform high volume SIP processing. For SIP servlet to perform a lengthy operation or high volume SIP processing, it can create an outgoing JMS request of any type, setting the JMSReplyTo header to the SipApplicationSession's particular SipApplicationSessionMessageListener, exit quickly to make way for other SipServlet.service( ) invocations on the dispatching threads. Later, when the asynchronous work is completed, the J2EE component answering the request may send a reply to the application queue using the JMSReplyTo header set in the original request. The queue will evaluate the JMS message and determine the appropriate SipApplicationSessionMessageListener via the applicationId selector. The SipApplicationSessionMessageListener.onMessage is invoked/re-awakened with the result of the asynchronous call.

Thus, no SIP container threads are consumed in the process, and the SIP container can continue executing in the background. And as mentioned above, because of JMS onMessage semantics, the onMessage is guaranteed not to be re-invoked before the first invocation returns.

If the HTTP/SIP converged container 114 on the server 160 fails, the application ID and messaging server have cluster-level scope allowing them to easily recover from single-server failures. However, the application must be designed to re-register each application's SipApplicationSessionMessageListener on failover. This can be accomplished using JSR 116 session activated/passivated listener callbacks. If a particular application session is unavailable for processing during an asynchronous callback, the JMS message will sit in the queue until the SipApplicationSessionMessageListener is re-registered with the JMS provider. No other SipApplicationSession can process incoming messages addressed to another session (i.e., no cross-talk exists).

As an example of an embodiment of the present invention, suppose in an information management system (IMS)/service oriented architecture (SOA) a Third Party Call Control (3PCC) interface is to be implemented. According to an embodiment of the invention, a 3PCC SIP application that uses JMS as a control interface may be used. When a client wants to initiate a call, the "appliationId=create" method described above may be used to create a SIP application session. The client can then send individual, asynchronous JMS messages to the SIP application session to perform tasks such as (a) initiate the call (b) invite individuals to the call, (c) mute/unmute a party, (d) terminate the call, (e) transfer one party to another SIP endpoint etc.

In such a case, a session bean that handles Web service invocations and which is able to communicate with the 3PCC SIP application through JMS will manage policy/logging/charging/etc. without involving the 3PCC SIP code with those details. A session bean may "query" the 3PCC SIP application session about the status of the call. Each component can be tested independently, and each can be re-used separately in other contexts because only a loose JMS contract connects them.

As another example of an embodiment of the present invention, suppose a CallDirection interface is to be implemented. CallDirection specifies that, should a phone number be busy or unreachable, for example, a Web service call is to be made out to an external Web service client to determine the next action. Several actions are possible. For instance, a different number may be tried or the original result may be allowed to continue. While the SIP-driven code is fairly easy to write (receive an INVITE, send it onward, check the response) invoking the Web service callback can be a very expensive operation that can tie up SIP container Request-Dispatcher threads. Given that the SIP container only has a limited number of threads, tying up a thread for several seconds while making a relatively slow Web Service invocation may lead to performance bottleneck and degradation.

Using the exemplary approach in this disclosure, CallDirection avoids the problem of limited threads. Instead of spawning threads, which is highly undesirable, or writing a one-off callback code to handle this particular issue, an embodiment of the present invention may be used. Thus, when a busy response is received, the SIP servlet generates a JMS request targeted towards a message-driven bean (MDB). The request includes a JMSReplyTo header pointing to the particular call's SipApplicationSessionMessageListener. Once the request is sent, the servlet continues processing. Other SIP requests/responses are serviced by the SIP container. In parallel, the MDB receives the request and makes the expensive and slow Web Service invocation to determine the appropriate action to take for the particular call. The MDB generates a JMS response and directs it to the JMSReplyTo destination in the original request. The queue invokes the SipApplicationSessionMessageListener for the original call, and the call "awakens" in the exact execution context necessary to perform the next bit of SIP signaling.

According to an embodiment of the present invention, some SIP systems may have JMS topics to which a SipApplicationSessionMessageListener may register interest. A topic-based SIP system allows broadcasting to multiple SipApplicationSessions in a running cluster. Messages such as system-going-down, report current status/billable events, monitor specific users, etc. could then be sent out across a runtime system.

Thus, in another embodiment, the SipApplicationSessionMessageListener may register with a JMS topic in addition to or instead of registering with the messaging server. JMS clients could then send messages to the topic which the JMS subsystem would then broadcast to multiple SipApplicationSessions within cluster 170 of FIG. 1(b).

For example, suppose a conferencing application is based on service tiers (differentiated services which can be metered and billed accordingly). A conference started by a standard user may cause the SipApplicationSessionMessageListener to register interest for topic "STANDARD_SERVICE" while a conference started by a premium user may register interest in topic "PREMIUM_SERVICE". In the event of system malfunctions, resource scarcity, or code upgrades, a JMS client (not shown) can broadcast to topic "STANDARD_SERVICE" to cause all in-flight standard conferences to gracefully terminate while the premium customers may remain unaffected.

Figure 2:
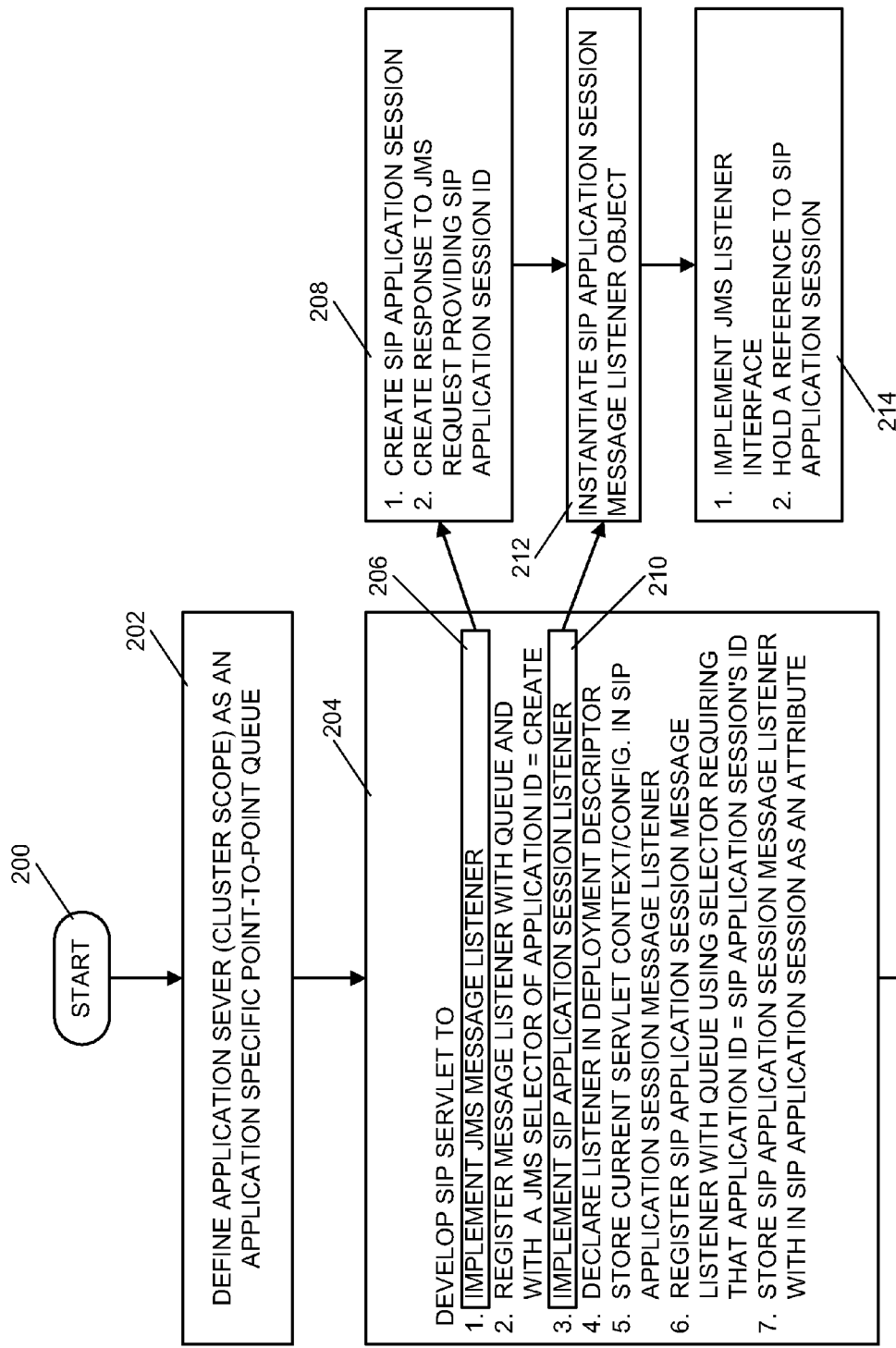
FIG. 2 is a flowchart of a process that may be used by a software developer to develop a servlet to implement an exemplary embodiment of the invention.

FIG. 2 is a flowchart of a process that may be used by a software developer to develop a servlet to implement an embodiment of the invention. The process starts when the developer decides to implement the embodiment of the invention (step 200). At that point the developer may redefine the application server, if it is a cluster-scope server, to be an application specific point-to-point queue (step 202). After doing so, the developer may, in step 204, develop a servlet to implement a JMS message listener (step 206) to create a SIP application session and to create a response to a JMS request providing the SIP application session ID (step 208).

Upon initialization, the servlet should register the message listener with the queue and with a JMS selector of application ID=create. Further, the servlet should implement a SIP application listener (step 210) which is to instantiate a SIP application message listener object (212), which in turn is to implement a JMS listener interface and hold a reference to the SIP application session (step 214).

Further, the servlet should declare the SIP application session listener in deployment descriptor (i.e., sip.xml) and store the current servlet context/configuration of the SIP application session as an attribute. The servlet should, in addition, register the SIP application message listener with the queue using a selector requesting that the JMS application ID header equal the SIP application session ID. Finally, the servlet should store the SIP application session message listener within the SIP application session as an attribute.

Figure 3:
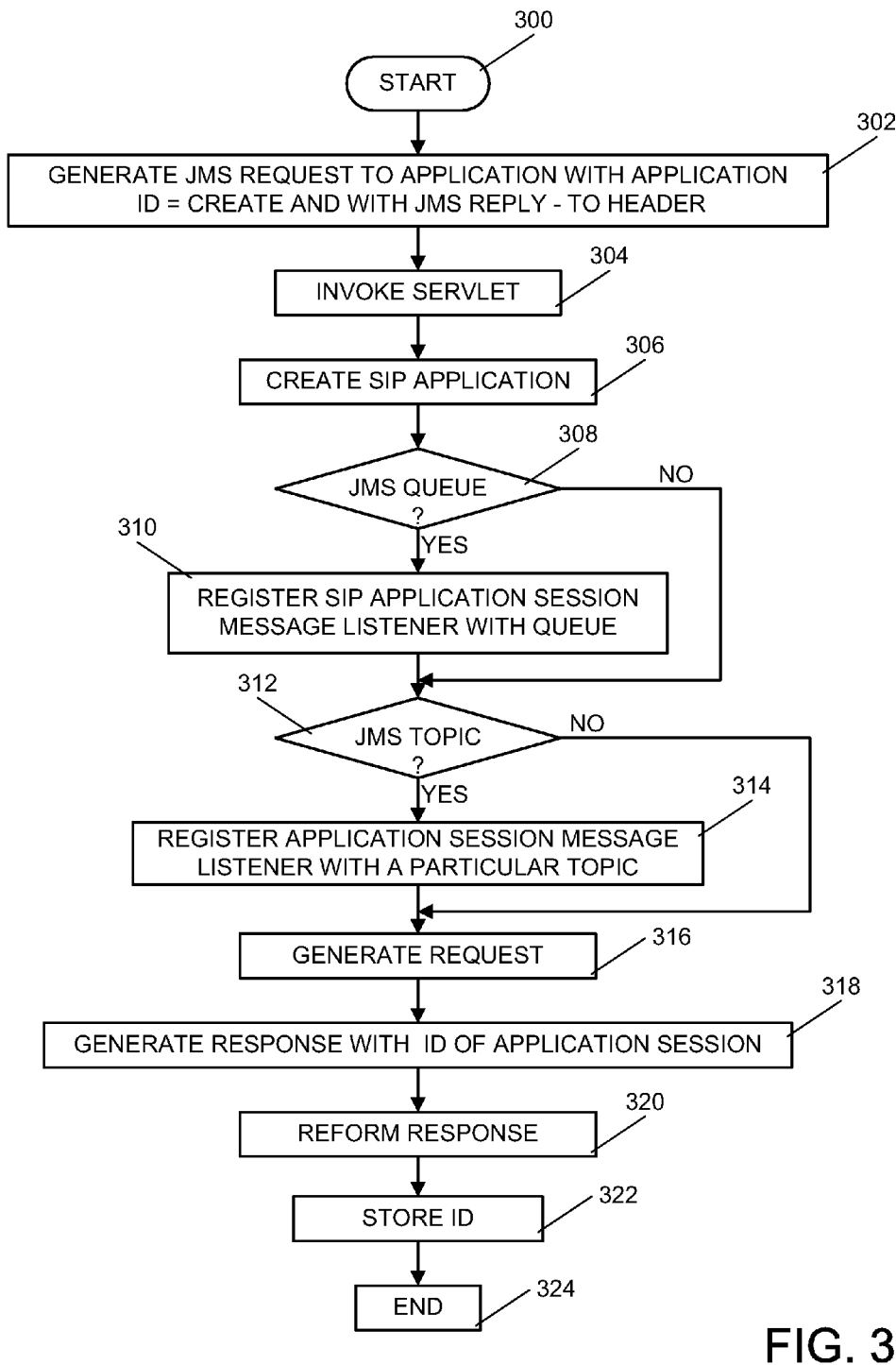
FIG. 3 is a flowchart of a process that may be used to implement an exemplary embodiment of a SIP application session using the servlet of FIG. 2.

FIG. 3 is a flowchart of a process that may be used to implement a SIP application session using the servlet. The process starts when a user is initiating a telephone call, for example (step 300). As the user initiates the telephone call, a JMS request is generated and forwarded to the application or queue with "applicationId=create" and with a JMS-Reply-to header allowing for a JMS response (step 302). Upon receiving the JMS message (i.e., request), the application or queue will invoke the servlet created in FIG. 2 (step 304). The servlet will create a Sip application session or SIP session (step 306).

After the SIP session creation, a check will be made to determine whether the SIP application session message listener is to be registered with the JMS queue (step 308). If so, the SIP application session message listener will be registered with the queue in order for the queue to receive requests with the SIP application ID (step 310). If the SIP application session message listener is not to be registered with the JMS queue, another check will be made to determine whether the SIP application session message listener is to be registered with a JMS topic (step 312). If so, the SIP application session message listener will be registered with the particular JMS topic (step 314). Note that if the SIP application session message listener is to be registered with both the JMS queue and a particular JMS topic, it can do so by following the yes fork of decision boxes 308 and 312.

In any event, the process continues in step 316 by generating a request to which a response containing the SIP application ID will be generated (318) and returned to the client system initiating the telephone call (320). Once the client system receives the SIP application ID, it will store it for future use (step 322) before the process ends (step 324).

Figure 4:
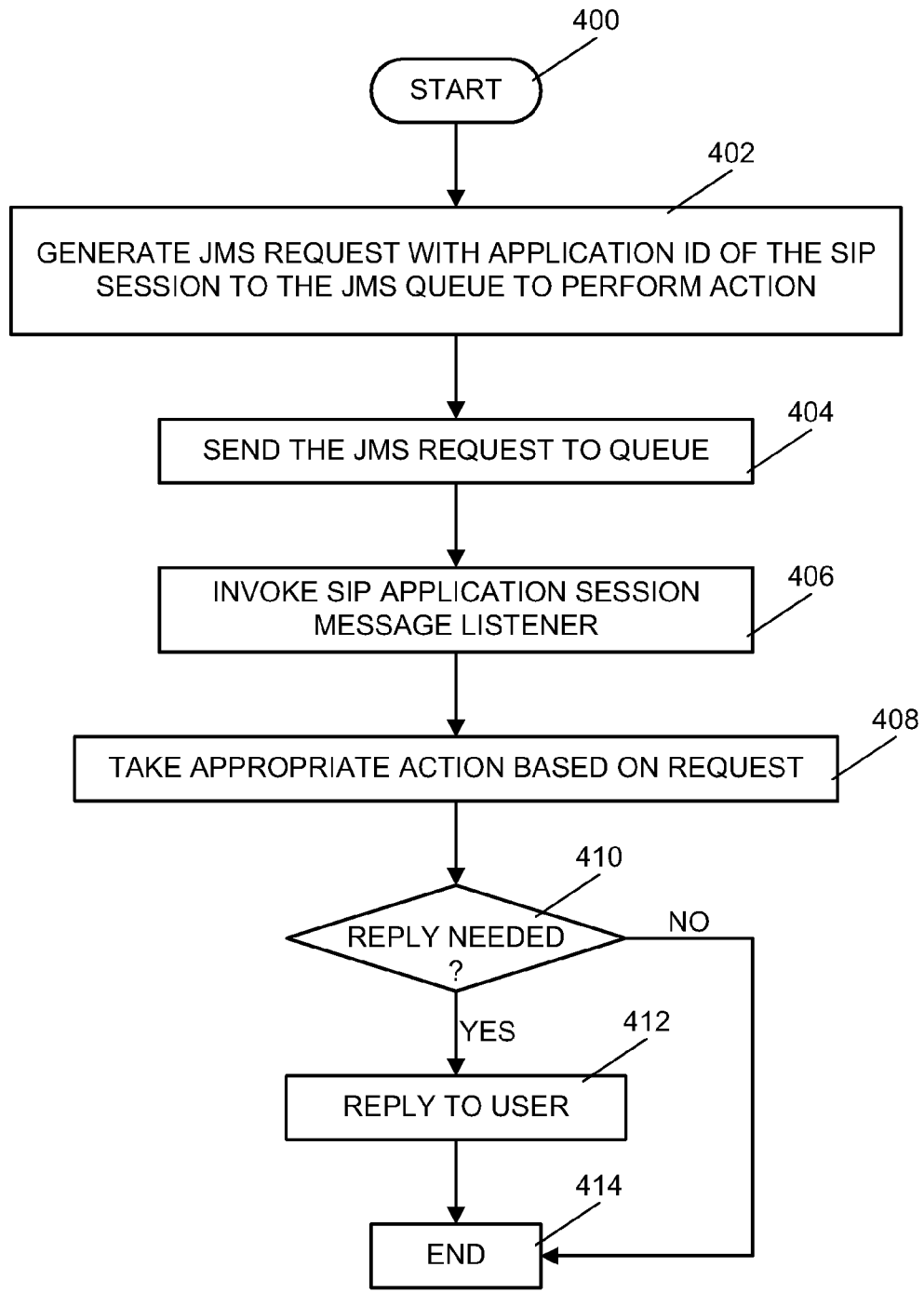
FIG. 4 is a flowchart of a process that may be used when an exemplary embodiment of the invention is used.

FIG. 4 is a flowchart of a process that may be used when a user, during a telephone call or conference, decides to take an action such as mute/un-mute a party, terminate the call, transfer one party to another SIP endpoint, etc. The process starts when the user takes the action (step 400). A JMS request to take the particular action is then generated (step 402) and sent to the queue (step 404). In this case, the request has the application ID of the SIP session in order to specify to which SIP session the request is directed. Upon receiving the request, the SIP application session message listener is invoked (step 408) and the appropriate action is taken (step 408). If a reply is needed, the reply is forwarded to the user before the process ends (steps 410, 412 and 414). Otherwise, the process ends without sending a reply to the user (steps 410 and 414).

The invention can take the form of a computer program product accessible from a computer-usable or computer-readable medium providing program code for use by or in connection with a computer or any other instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and Digital VideoNersatile Disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Figure 5:
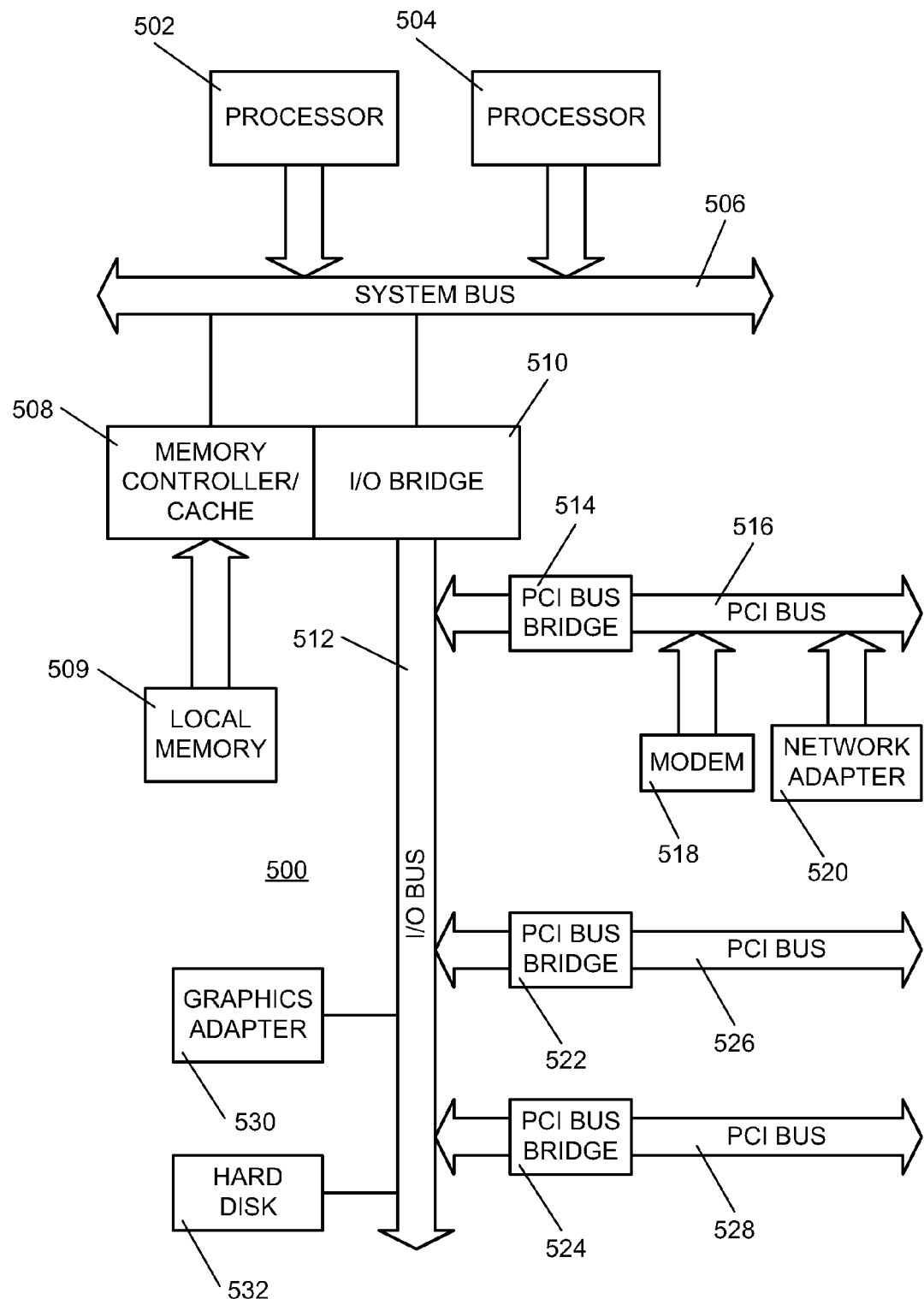
FIG. 5 is a block diagram of a data processing system of a server on which an exemplary embodiment of the invention may be implemented.

FIG. 5 is a block diagram of a data processing system that may be implemented as a server, such as servers 150 and 160 in FIG. 1. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to PCI local bus 516. Typical PCI bus implementations will support four PCI expansion slots or add-in connectors. Communications links to clients $UA_A$ 104, $UA_B$ 124 and $UA_C$ 144 in FIG. 1 may be provided through modem 518 and network adapter 520 connected to PCI local bus 516 through add-in boards. Additional PCI bus bridges 522 and 524 provide interfaces for additional PCI local buses 526 and 528, from which additional modems or network adapters may be supported. In this manner, data processing system 500 allows connections to multiple network computers. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 5 may be, for example, an IBM e-Server pSeries system, a product of International Business Machines Corporation in Armonk, N.Y., running the Advanced Interactive Executive (AIX) operating system or LINUX operating system.

Figure 6:
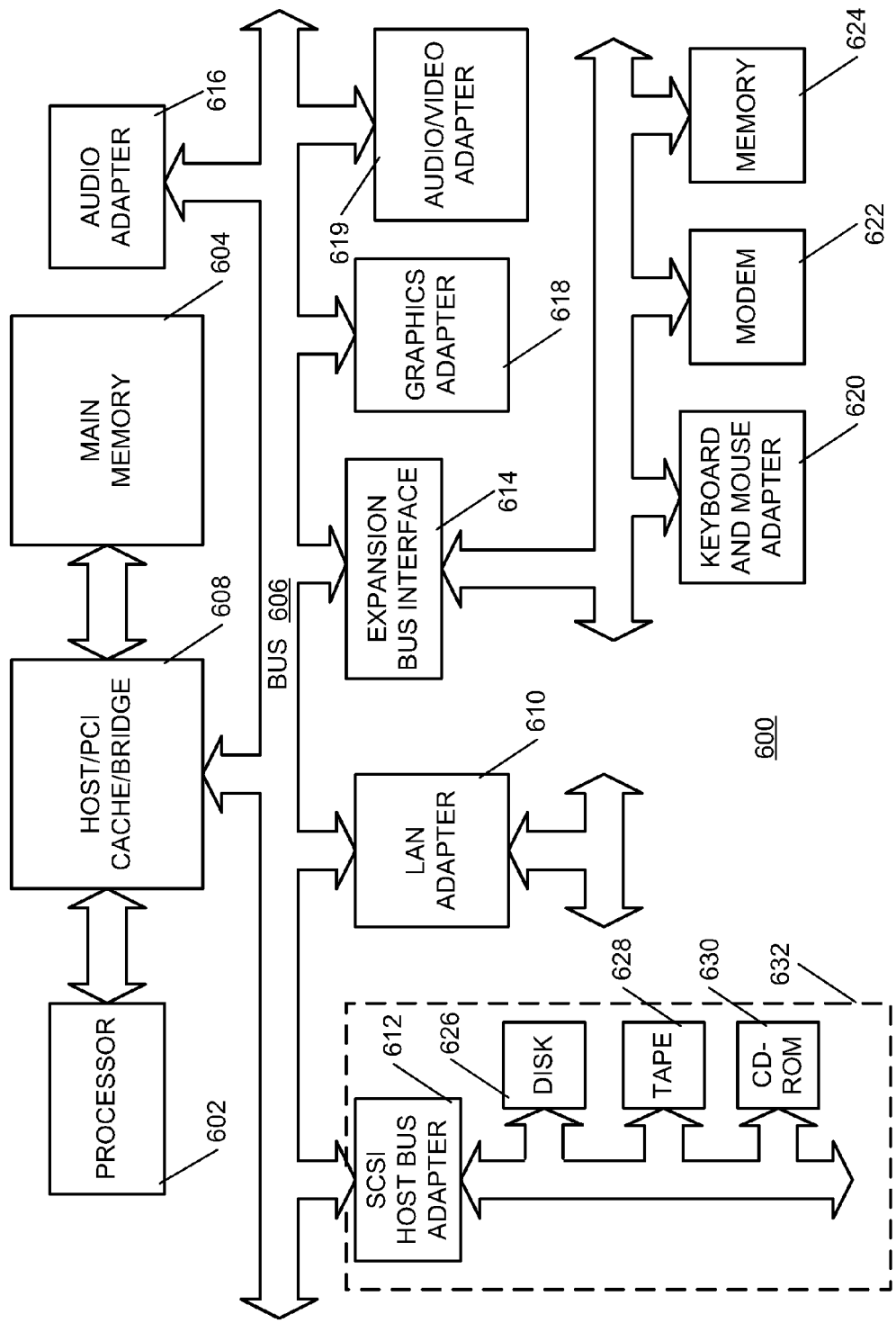
FIG. 6 is a block diagram of a data processing system of a client or a user agent (UA) that may used an exemplary embodiment of the invention.

With reference now to FIG. 6, a block diagram illustrating a data processing system is depicted in which the present invention may be implemented. Data processing system 600 is an example of a client computer system such as clients $UA_A$ 104, $UA_B$ 124 and $UA_C$ 144 in FIG. 1. Data processing system 600 employs a peripheral component interconnect (PCI) local bus architecture. Although the depicted example employs a PCI bus, other bus architectures such as Accelerated Graphics Port (AGP) and Industry Standard Architecture (ISA) may be used. Processor 602 and main memory 604 are connected to PCI local bus 606 through PCI bridge 608. PCI bridge 608 also may include an integrated memory controller and cache memory for processor 602. Additional connections to PCI local bus 606 may be made through direct component interconnection or through add-in boards. In the depicted example, local area network (LAN) adapter 610, Small computer system interface (SCSI) host bus adapter 612, and expansion bus interface 614 are connected to PCI local bus 606 by direct component connection. In contrast, audio adapter 616, graphics adapter 618, and audio/video adapter 619 are connected to PCI local bus 606 by add-in boards inserted into expansion slots. Expansion bus interface 614 provides a connection for a keyboard and mouse adapter 620, modem 622, and additional memory 624. SCSI host bus adapter 612 provides a connection for hard disk drive 626, tape drive 628, and CD-ROM drive 630. Typical PCI local bus implementations will support three or four PCI expansion slots or add-in connectors as shown by local PCI expansion slot 632.

An operating system runs on processor 602 and is used to coordinate and provide control of various components within data processing system 600 in FIG. 6. The operating system may be a commercially available operating system, such as Windows XP®, which is available from Microsoft Corporation. An object oriented programming system such as Java may run in conjunction with the operating system and provide calls to the operating system from Java programs or applications executing on data processing system 600. "Java" is a trademark of Sun Microsystems, Inc. Instructions for the operating system, the object-oriented operating system, and applications or programs are located on storage devices, such as hard disk drive 626, and may be loaded into main memory 604 for execution by processor 602.

Those of ordinary skill in the art will appreciate that the hardware in FIG. 6 may vary depending on the implementation. Other internal hardware or peripheral devices, such as flash ROM (or equivalent nonvolatile memory) or optical disk drives and the like, may be used in addition to or in place of the hardware depicted in FIG. 6. Also, the processes of the present invention may be applied to a multiprocessor data processing system.

As another example, data processing system 600 may be a stand-alone system configured to be bootable without relying on some type of network communication interface, whether or not data processing system 600 comprises some type of network communication interface. As a further example, data processing system 600 may be a Personal Digital Assistant (PDA) device, which is configured with ROM and/or flash ROM in order to provide non-volatile memory for storing operating system files and/or user-generated data.

The depicted example in FIG. 6 and above-described examples are not meant to imply architectural limitations. For example, data processing system 600 may also be a notebook computer or hand held computer as well as a PDA. Further, data processing system 600 may also be a kiosk or a Web appliance.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application and to enable others of ordinary skill in the art to understand the invention for various embodiments with various modifications as are suited to the particular use contemplated.

What is claimed is:

1. A computer-implemented method of communicating with a Session Initiation Protocol (SIP) application session using a messaging service comprising:
    defining an SIP application server as an application specific point-to-point queue;
    creating, using an SIP servlet, an SIP application session on an SIP client and on an SIP application server, wherein the SIP servlet implements a Java Message Service (JMS) message listener and a SIP application session message listener, wherein the SIP application session message listener instantiates a SIP application message listener object, wherein the SIP application message listener object implements a JMS listener interface and holds a reference to the SIP application session;
    providing an SIP application session identification;
    registering the SIP application session message listener with the SIP application server using a selector requiring that a JMS application identification header equals the SIP application session identification;
    storing the SIP application session message listener within the SIP application session as an attribute;
    publishing an addressable messaging endpoint corresponding to the SIP application session in response to registering the SIP application session message listener with the SIP application server; and
    communicating between the SIP application server and the SIP application session on the SIP client via messages directed to the published addressable messaging endpoint through a JMS transport and an SIP transport linking the SIP application session on the client and on the SIP application server.

2. The computer-implemented method of claim 1 wherein the messages are Web services or hypertext transport protocol (HTTP) requests and responses.

3. The computer-implemented method of claim 1 wherein registering the SIP application session with the messaging server includes subscribing the SIP application session to a message topic.

4. A computer program product on one or more computer readable tangible storage devices for allowing for communication with a Session Initiation Protocol (SIP) application session using a messaging service comprising:
    program instructions stored on one or more computer readable tangible storage devices for defining an SIP application server as an application specific point-to-point queue;
    program instructions stored on the one or more computer readable tangible storage devices for creating, using an SIP servlet, an SIP application session on an SIP client and on an SIP application server, wherein the SIP servlet implements a Java Message Service (JMS) message listener and a SIP application session message listener, wherein the SIP application session message listener instantiates a SIP application message listener object, wherein the SIP application message listener object implements a JMS listener interface and holds a reference to the SIP application session;
    program instructions stored on the one or more computer readable tangible storage devices for providing an SIP application session identification;
    program instructions stored on the one or more computer readable tangible storage devices for registering the SIP application session message listener with the SIP application server using a selector requiring that a JMS application identification header equals the SIP application session identification;
    program instructions stored on the one or more computer readable tangible storage devices for storing the SIP application session message listener within the SIP application session as an attribute;
    program instructions stored on the one or more computer readable tangible storage devices for publishing an addressable messaging endpoint corresponding to the SIP application session in response to registering the SIP application session message listener with the SIP application server; and
    program instructions stored on the one or more computer readable tangible storage devices for communicating between the SIP application server and the SIP application session on the SIP client via messages directed to the published addressable messaging endpoint through a JMS transport and an SIP transport linking the SIP application session on the client and on the SIP application server.

5. The computer program product of claim 4 wherein the messages are Web services or hypertext transport protocol (HTTP) requests and responses.

6. The computer program product of claim 4 wherein registering the SIP application session with the messaging server includes subscribing the SIP application session to a message topic.

7. A computer system for communicating with a Session Initiation Protocol (SIP) application session using a messaging service comprising:

one or more processors, one or more computer readable memories, and one or more computer readable tangible storage devices;

program instructions stored on at least one of the one or more computer readable tangible storage devices for execution by at least one of the one or more processors via at least one of the one or more computer readable memories for defining an SIP application server as an application specific point-to-point queue;

program instructions stored on at least one of the one or more computer readable tangible storage devices for execution by at least one of the one or more processors via at least one of the one or more computer readable memories for creating, using an SIP servlet, an SIP application session on an SIP client and on an SIP application server, wherein the SIP servlet implements a Java Message Service (JMS) message listener and a SIP application session message listener, wherein the SIP application session message listener instantiates a SIP application message listener object, wherein the SIP application message listener object implements a JMS listener interface and holds a reference to the SIP application session;

program instructions stored on at least one of the one or more computer readable tangible storage devices for execution by at least one of the one or more processors via at least one of the one or more computer readable memories for providing an SIP application session identification;

program instructions stored on at least one of the one or more computer readable tangible storage devices for execution by at least one of the one or more processors via at least one of the one or more computer readable memories for execution by at least one of the one or more processors via at least one of the one or more computer readable memories for registering the SIP application session message listener with the SIP application server using a selector requiring that a JMS application identification header equals the SIP application session identification;

program instructions stored on at least one of the one or more computer readable tangible storage devices for execution by at least one of the one or more processors via at least one of the one or more computer readable memories for storing the SIP application session message listener within the SIP application session as an attribute;

program instructions stored on at least one of the one or more computer readable tangible storage devices for execution by at least one of the one or more processors via at least one of the one or more computer readable memories for publishing an addressable messaging endpoint corresponding to the SIP application session in response to registering the SIP application session message listener with the SIP application server; and program instructions stored on at least one of the one or more computer readable tangible storage devices for execution by at least one of the one or more processors via at least one of the one or more computer readable memories for communicating between the SIP application server and the SIP application session on the SIP client via messages directed to the published addressable messaging endpoint through a JMS transport and an SIP transport linking the SIP application session on the client and on the SIP application server.

8. The computer system of claim 7 wherein the messages are Web services or hypertext transport protocol (HTTP) requests and responses.

9. The computer system of claim 7 wherein registering the SIP application session with the messaging server includes subscribing the SIP application session to a messaging topic.

* * * * *